2 Sheets—Sheet 1.

G. R. AYRES.
Fly-Net for Horses.

No. 216,133. Patented June 3, 1879.

Witnesses
Henry Howson Jr
Harry Smith

Inventor
G. Ralston Ayres
by his Attorneys
Howson & Son

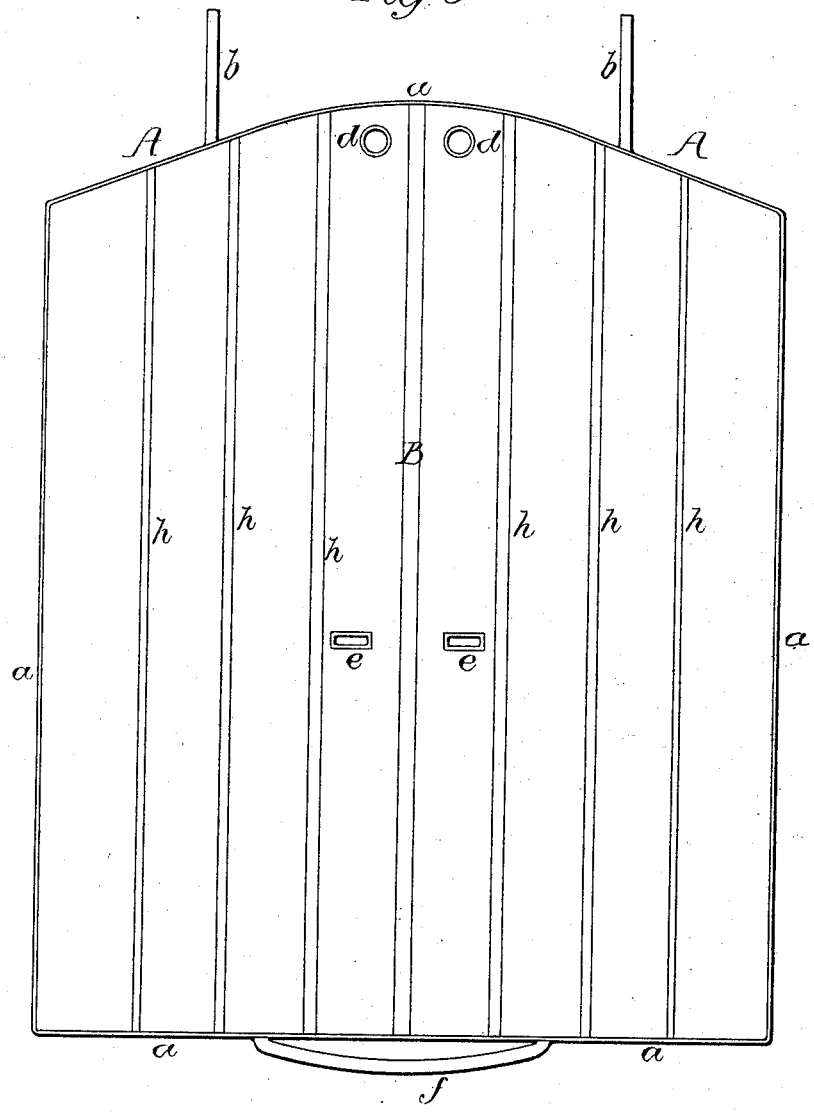

UNITED STATES PATENT OFFICE.

G. RALSTON AYRES, OF PHILADELPHIA, PENNSYLVANIA, ASSIGNOR TO HIMSELF, WILLIAM AYRES, JOHN C. AYRES, W. MONTGOMERY AYRES, AND LEWIS H. AYRES, OF SAME PLACE.

IMPROVEMENT IN FLY-NETS FOR HORSES.

Specification forming part of Letters Patent No. 216,133, dated June 3, 1879; application filed May 5, 1879.

*To all whom it may concern:*

Be it known that I, G. RALSTON AYRES, of Philadelphia, Pennsylvania, have invented a new and useful Improvement in Fly-Nets for Horses, of which the following is a specification.

My invention consists of a cheap and substantial fly-net of woven fabric, with which are combined certain strengthening-bands, in the manner described hereinafter, so as to prevent the tearing and disintegration of the open portion of the fabric by the movements of the horse's head or body, or of the harness.

Figure 1:
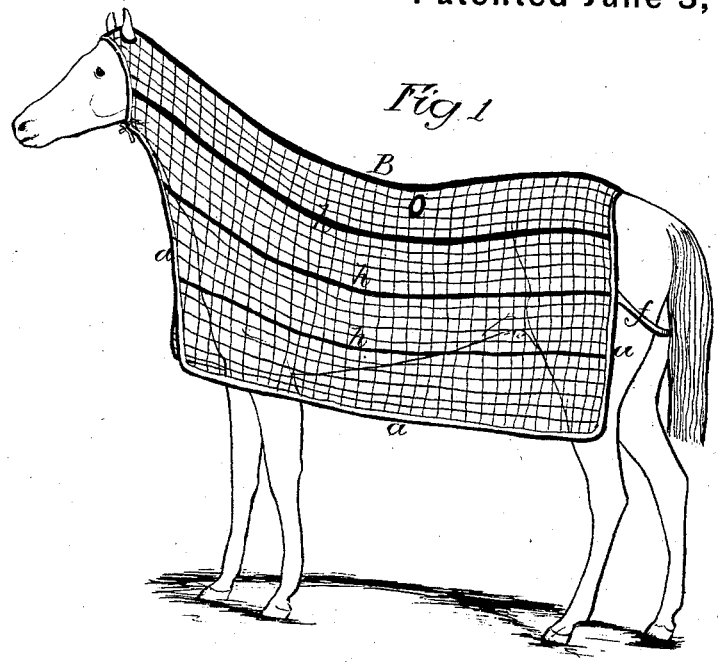
Figure 2:
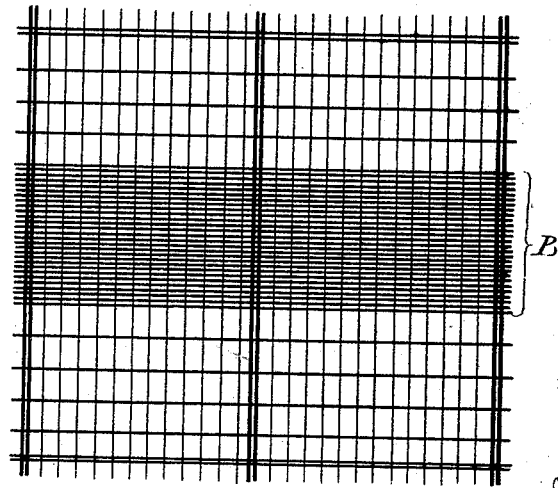

In the accompanying drawings, Figure 1, Sheet 1, is a view of the fly-net as it appears when applied to a horse; Fig. 2, an enlarged view of part of the net; and Fig. 3, Sheet 2, a view of the net as it appears when folded out.

The body of the net is of open woven fabric, the edges of the net being strengthened by suitable binding a.

The front end of the net is formed to fit to the horse's head, as shown in Fig. 1, and is furnished with strings b or straps and buckles, so that the two edges A A' may be fastened together below the horse's head and in front of its breast.

There are the usual ear-holes d d, the holes e e for receiving the terrets of the saddle or the reins, and at the rear end is the usual tail-cord f.

The cheapest, and at the same time most effective, fly-nets are made of woven fabric with open meshes, the only objection to this class of nets, as usually made, being their liablity to be torn by the constant movement of the horse's head or body and of the harness, which necessarily subjects the net to severe longitudinal strains.

In order to remedy this defect without materially adding to the cost of the net, I incorporate with the latter certain longitudinal strengthening-bands, extending from the front to the rear of the net.

The most important of these bands is the band B, arranged in the center of the net, and extending from the front end at a point between the ear-holes to the rear end and passing between the terret-holes.

The net is further strengthened by similar bands, h, one or more on each side of the central band, and it is advisable to attach the straps or tapes by which the front ends, A A', of the net are secured together at or near the points where the supplementary bands terminate. These strengthening-bands constitute part of the woven fabric, the threads of which they are composed being incorporated in the said fabric during the process of weaving the same, so that the additional expense incurred in thus strengthening the net is very trifling.

I do not desire to claim, broadly, a fly-net part of which is composed of longitudinal bands; but

I claim as my invention—

The within-described fly-net, composed of a woven fabric, having a central longitudinal band, B, extending from front to rear, and having one or more longitudinal bands, h, on each side of the main band, the said bands being incorporated in and forming part of the fabric, all as set forth.

In testimony whereof I have signed my name to this specification in the presence of two subscribing witnesses.

G. RALSTON AYRES.

Witnesses:
   WILLIAM J. COOPER,
   HARRY SMITH.